July 8, 1958  O. K. MIDKIFF  2,842,089
REMOVABLE TELESCOPING SIGHT GLASSES FOR CONDUITS
Filed July 23, 1956
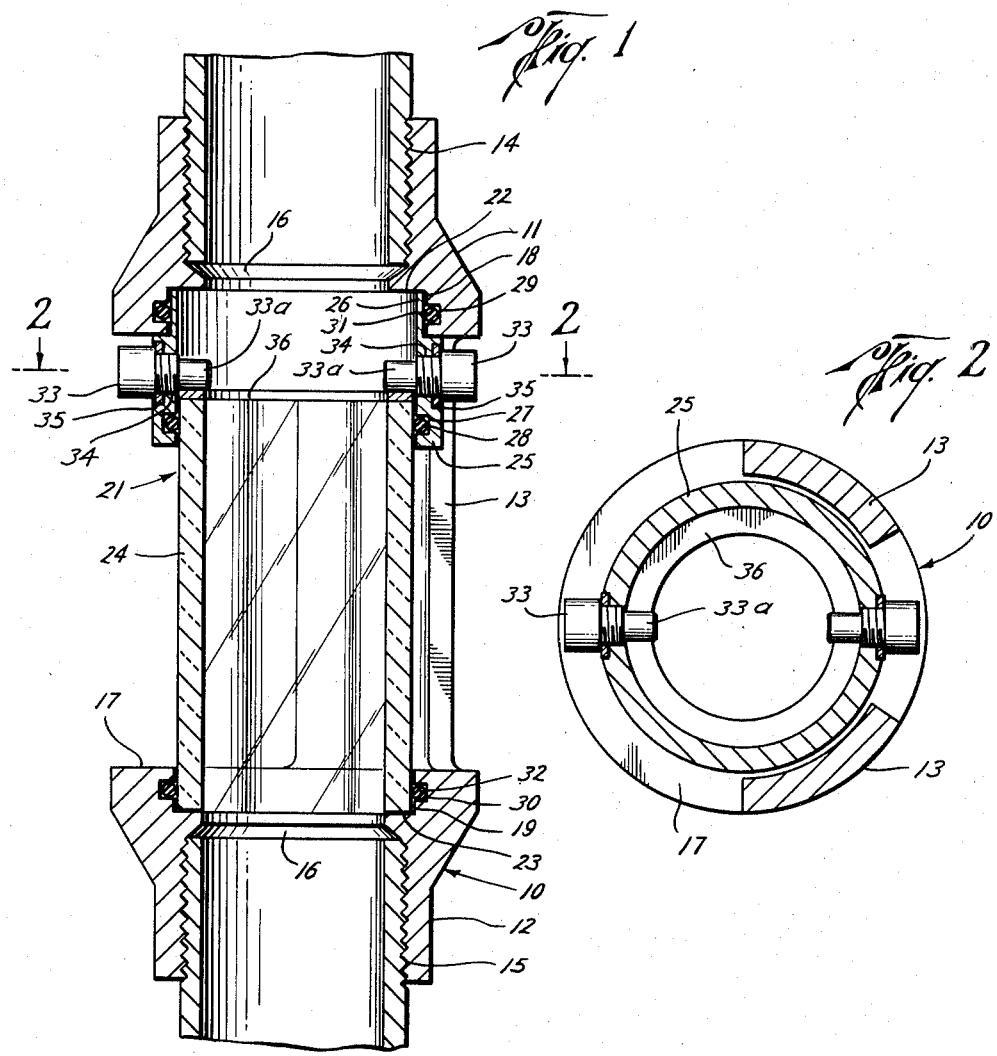
O. K. Midkiff
INVENTOR.
BY
Browning Simms & Hyer
ATTORNEYS

United States Patent Office 2,842,089
Patented July 8, 1958

2,842,089

REMOVABLE TELESCOPING SIGHT GLASSES FOR CONDUITS

Omer K. Midkiff, Hobbs, N. Mex., assignor to U. S. Industries, Inc., New York, N. Y., a corporation of Delaware Application July 23, 1956, Serial No. 599,630

5 Claims. (Cl. 116—117)

This invention relates to sight glasses and more particularly to sight glasses in which the transparent element may be quickly and easily removed without the necessity of removing the sight glass from a flow line.

Sight glasses are generally used where it is desired to visually inspect the condition of a fluid. In many installations the transparent element will have an indefinite life. However, where it is desired to use a sight glass in conjunction with a fluid which in time renders the transparent member opaque, such as a fluid containing abrasives which etch the transparent member, the transparent member must be replaced at frequent intervals. In the past, the replacement of the transparent element has required that a line be broken apart to permit removal of the sight glass which is then disassembled and the transparent member replaced.

It is an object of this invention to provide a sight glass in which the transparent member may be quickly and easily removed and a new member inserted in its place without removing the sight glass from the conduit of which it forms a part.

Another object is to provide a sight glass with a transparent member which can be removed and replaced without removing the sight glass from a flow line, in which the transparent member forms a part of a telescoping member and all seals are perfected by extension of the telescoping member within the body of the sight glass.

Other objects, features and advantages of this invention will be apparent from the drawing, the specification and the claims.

In the drawing wherein there is shown an illustrative embodiment of this invention and wherein like reference numerals indicate like parts:

Fig. 1 is a view in longitudinal cross section through a sight glass constructed in accordance with this invention; and Fig. 2 is a cross sectional view taken along the lines 2—2 of Fig. 1 in the direction of the arrows.

The body of the sight glass is provided by a generally tubular shaped member indicated generally at 10. Body 10 includes end pieces 11 and 12 which are held in rigid spaced apart relationship by one or more spacing ribs 13. Preferably, the end members and ribs are formed from a single piece of stock to provide an integral body. The body is provided at opposite ends with suitable end fittings to permit connecting the body in a flow line such as the threaded end fittings 14 and 15 illustrated. The end fittings 14 and 15 provide a part of a bore 16 which extends completely through the body.

As best seen in Fig. 2, the ribs 13 are arranged to provide a side door 17 opening into the bore through the body. Preferably, the ribs 13 are arranged about a half circle to provide a side door of 180°. The side door extends longitudinally from the end member 11 to end member 12 and provides for the insertion and removal of the transparent member of the sight glass as will appear below.

Bore 16 is counterbored in end members 11 and 12 at 18 and 19 respectively. The counterbores confront each other and receive the telescoping parts providing the telescoping member indicated generally at 21. The counterbore 18 is slightly larger in size than counterbore 19 to receive the outer of the two telescoping parts. Counterbores 18 and 19 provide shoulders 22 and 23 respectively against which the telescoping member is extended to confine the telescoping member within the body.

The telescoping member 21 provides a part of the flow passageway through the sight glass. To permit visual inspection of the fluid flowing through the sight glass, one section of the telescoping member is formed of transparent material. Preferably, this is the inner transparent part 24 of the telescoping member. The transparent member 24 may be formed from any desired material which is transparent and which will withstand the pressures, temperature changes, etc. to be expected in the service for which the sight glass is intended. Due to its all around serviceability, Plexiglas is the generally preferred material.

The outer section of the telescoping member 21 is preferably formed by an outer part such as 25 which is concentric with inner member 24. Part 25 has a much shorter axial dimension than does the transparent part 24 to provide a large viewing area through the transparent member 24.

The inner and outer parts 24 and 25 of the telescoping member are provided with a close sliding fit with each other. The inner telescoping part 24 has a close sliding fit with counterbore 19 in end fitting 12. Likewise, the outer telescoping part 25 of the telescoping member has a reduced diameter portion 26 which has a close sliding fit with counterbore 18. When the telescoping parts are extended into abutment with shoulders 22 and 23, the telescoping parts will overlap each other as shown in Fig. 1 to prevent their being removed through the side door 17. The axial dimension of the transparent member 24 is slightly less than the axial dimension of the side door 17 and therefore upon telescoping of the outer part 25 over inner part 24, the telescoping member can be removed and inserted through side door 17. It is apparent that by forming outer part 25 with a constant diameter outer wall and deepening counterbore 18, the outer part 25 could be moved into the counterbore 18 to disengage transparent member 24, and clear side door 17. The transparent member could then be removed through the side door. Such construction and its equivalents are within the scope of some of the claims of this application. However, it is preferred that the telescoping parts telescope over each other as illustrated, to prevent malfunction of the apparatus due to deposits of solid matter in the counterbore 18. Not only would solid matter tend to block the counterbore, but small particles would tend to find their way between the bore wall and the telescoping part and jam the part in the bore.

Suitable seal means is provided between the sections of the telescoping member and between the telescoping member and the body at each end of the telescoping member to provide leak-tight connections therebetween.

Preferably, these seals are energized by extension of the telescoping member within the bore through the body to provide for simplicity of assembly. These seals are preferably provided by pressure energized seals. Preferably, the outer section 25 of the telescoping member is provided with a groove 27 which overlies the transparent member 24 when the telescoping member is extended and an O-ring 28 positioned within this groove seals between the two sections of the telescoping member. In like manner, the counterbores 18 and 19 are provided with grooves 29 and 30 and O-rings 31 and 32 are positioned within these grooves respectively to seal between the body and the telescoping member when the latter is extended within the bore through the body.

A suitable latching means should be provided to maintain the telescoping parts in extended telescoping relationship with each other and with the bore wall. The latching means may be conveniently provided by dimensioning the telescoping member, when extended, to substantially fill both counterbores 18 and 19 so that shoulders 22 and 23 act as stops, and by one or more bolts 33 threadedly received in threaded bores 34 extending through the wall of the outer telescoping member 25. A washer 35 prevents leakage between the bolts and the outer telescoping member. The bolts 33 have a section 33a which extend into the bore through the outer telescoping member 25 and overlie the adjacent end of the transparent telescoping member 24 in a manner to prevent the telescoping sections 24 and 25 from telescoping over each other. Preferably, these bolts are two or more in number and equally spaced circumferentially about the outer telescoping member 25 to equally distribute stresses tending to collapse the telescoping member. To increase the bearing area of the bolts 33 on the end of the transparent member 24, a rigid washer 36, preferably steel, can be provided between the end face of the inner telescoping member 24 and the extensions 33a on bolts 33. The washer 36 may be maintained in place by cementing it to the transparent member 24 if desired.

In operation, the body 10 is made-up in a flow conduit through which the liquid to be inspected will pass. The O-rings 28, 31 and 32 are positioned in their respective grooves and the outer telescoping part telescopes over transparent part 24. The telescoping member is then inserted through side door 17 and the telescoping member extended to the position shown in Fig. 1. The lock bolts 33 are then inserted to lock the telescoping member in extended position. Upon the transparent member 24 being etched or in any other way rendered opaque, it may be simply and easily exchanged by removing the bolts 33, collapsing the telescoping member and removing the telescoping member from the body. Another transparent member 24 can then be inserted into the outer telescoping member 25 and the telescoping member replaced in the body as explained above.

From the above, it can be seen that the objects of this invention have been attained. There has been provided a sight glass in which the transparent member may be quickly and easily removed and replaced. All seals are energized by extending the telescoping member and therefore the exchange of transparent members may be quickly and easily made.

From the foregoing it will be seen that this invention is one well adapted to attain all the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A sight glass comprising, a body having a bore therethrough, a side door in the body opening into the bore, a plurality of tubular telescoping parts telescoped in an operative position with each other and with the bore on opposite sides of the side door to bridge the side door, means sealing between the telescoping parts and the bore wall and between adjacent telescoping parts whereby the bore through the body and the telescoping parts provide a flow passageway through the body, said telescoping parts being movable axially relative to each other from said operative position to a dismantling position to free at least one of the telescoping parts from the telescoping relationship, said removable part having length and width dimensions smaller than the corresponding dimensions of said door to permit its removal and replacement through the side door when the telescoping parts are in dismantling position and also being transparent to permit visual inspection of the contents of the flow passageway, and means for releasably latching the telescoping parts to each other and to the bore wall to maintain the telescoping parts in the body when in said operative position.

2. A sight glass comprising, a body having a bore therethrough, a side door in the body opening into the bore, opposing abutments on the body respectively situated on opposite sides of the side door, a tubular member having telescoping parts; the member being of a smaller size when collapsed than that of the side door so as to be insertable and removable from the bore through the side door when collapsed and extensible in the bore into engagement with said abutments to span the side door with its ends opening into the bore on opposite sides of the side door, means sealing between the telescoping member and the bore wall on opposite sides of the side door and between the telescoping parts of the tubular member, whereby the bore through the body and the tubular member provide a flow passageway through the body, at least one of the telescoping parts of the tubular member being transparent to permit visual inspection of the contents of the flow passageway, and means for releasably latching the telescoping parts of the tubular member in extended position and preventing relative movement therebetween toward collapsed position, said tubular member, with the latching means engaged, being in engagement with said abutments.

3. The sight glass of claim 2 wherein the seal means is provided by pressure energized seals.

4. A sight glass comprising, a body having a bore therethrough, a side door in the body opening into the bore, a first counterbore in the body on one side of the side door, a second counterbore in the body on the other side of the side door, said counterbores facing each other, a tubular telescoping member comprising two annular concentric parts having a sliding fit with each other and with the respective counterbores so as to be movable between collapsed and expanded positions, said telescoping member when in collapsed position being smaller than said side door so as to be insertable and removable from the bore through the side door when collapsed and expansible into the counterbores to span the side door with its ends opening into the bore on opposite sides of the side door, one of the telescoping parts being transparent to permit visual inspection of the contents of the passageway through the telescoping member, latching means carried by the one telescoping part and releasably engaging the other part when the telescoping member is extended to prevent collapse of the telescoping member, said telescoping member substantially filling the counterbores when extended, and O-rings in each counterbore and sealing between the body and the ends of the telescoping member and an O-ring carried by one telescoping part and sealing between the telescoping parts when they are extended, whereby the bore through the body and the telescoping member provide a flow passageway through the body.

5. The sight glass of claim 4 wherein an annular washer of rigid material is positioned within the outer telescoping part and bears against the end of the inner telescoping part, and the latching means engages the washer.

References Cited in the file of this patent

UNITED STATES PATENTS

| | | |
|---|---|---|
| 828,108 | Graham | Aug. 7, 1906 |
| 1,159,764 | Heller | Nov. 9, 1915 |
| 1,213,986 | Werbeck | Jan. 30, 1917 |
| 1,910,752 | Coles | May 23, 1933 |
| 2,605,640 | Partch et al. | Aug. 5, 1952 |
| 2,624,308 | Wittin | Jan. 6, 1953 |